Figure 1:
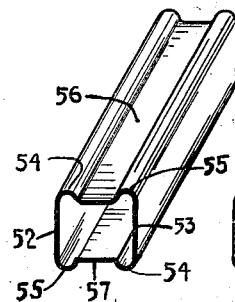

Nov. 9, 1937.  R. G. MILLER  2,098,752

STRUCTURAL SECTION FOR AIRCRAFT

Filed Feb. 6, 1935　　2 Sheets-Sheet 1

INVENTOR.
ROY G. MILLER.
BY Frank H. Borden
ATTORNEY.

Nov. 9, 1937.   R. G. MILLER   2,098,752
STRUCTURAL SECTION FOR AIRCRAFT
Filed Feb. 6, 1935   2 Sheets-Sheet 2

INVENTOR.
ROY G. MILLER
BY
Frank H. Borden
ATTORNEY.

Patented Nov. 9, 1937

2,098,752

UNITED STATES PATENT OFFICE 2,098,752

STRUCTURAL SECTION FOR AIRCRAFT

Roy G. Miller, Langhorne, Pa., assignor to Fleetwings, Inc., Bristol, Pa., a corporation of Delaware Application February 6, 1935, Serial No. 5,191

23 Claims. (Cl. 189—36)

This invention relates to structural sections for aircraft and particularly to strut members and the joints thereof with cap sections of truss structures.

It is among the objects of this invention; to improve structural sections for aircraft; to provide a strut of a truss in which a strengthening bead is formed in the strut and prolonged across the cap strip; to provide struts having beads or longitudinal flutings extending the full length of the strut; to provide a strut having a bead extending the length of the strut and having flattened engaging surfaces on each side of the bead to form a stabilized closed section with a cap strip; to provide a closed tubular strut having an open end to receive a cap strip while maintaining the maximum of material of the strut at the open end; to provide a closed tubular strut with an open end provided with flattened substantially parallel spaced walls to engage a cap strip; to provide a closed tubular strut with flared ends to form substantially parallel enlarged flattened walls arranged for straddling engagement with a cap strip; to provide a closed tubular strut having a flared end comprising spaced substantially parallel walls having each a longitudinal bead and flattened portions on each side of the bead to stabilize; to provide a strut comprising a closed tubular section having beads and so arranged that when the section is opened up at an end to form a cap strip receiving yoke the bend lines will occur in metal adjacent the beads, that had not previously been worked, thereby allowing the strut end to be formed without reworking and weakening the metal of the strut; to provide improvements in struts and joints generally; to provide an improved joint between a strut and a cap strip in a truss construction; to provide a rolled strut having longitudinal beads and having a joint with a cap strip in which the component parts of the strut at the joining end are subjected to but a single bending or flexing operation in the forming of the end itself to obviate undue "working" of the metal; to provide a closed tubular strut having a flange and having a bifurcated end each wall of which includes a portion of the said flange as a reinforcing element; to provide an improved method of forming struts for aircraft structures; to provide a strut terminal by which a strut merges into attached engagement with a cap strip without appreciable diminution of its strength; to improve rib sections of aircraft; to join struts and cap strips together without gussets and without loss of strength at the joint; to provide an improved cap strip for truss structures of aircraft; to provide a strut of a closed section including a corner bead extending longitudinally thereof so that a side wall portion may be removed to leave a front wall portion that is flat so as to properly engage a cap strip; to provide a strut of a closed tubular section with a portion of a wall removed to open the section to permit a flat engagement of another wall portion on a cap strip; and many other objects and advantages as will become more apparent as the description proceeds.

Figure 2:
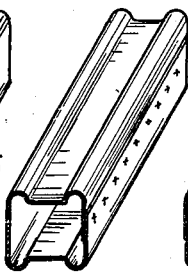
Figure 3:
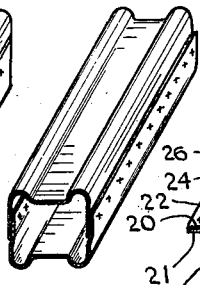
Figure 4:
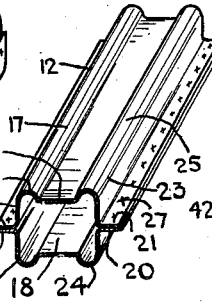
Figure 5:
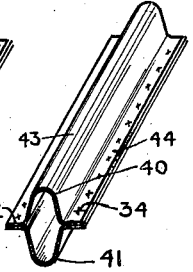
Figure 6:
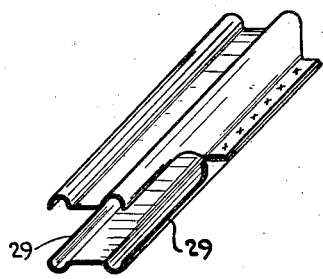
Figures 9, 10:
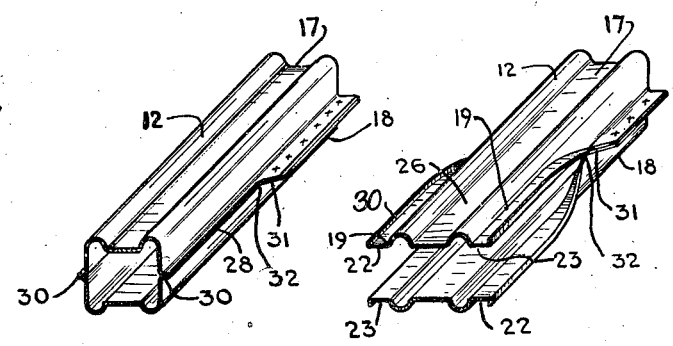
Figure 11:
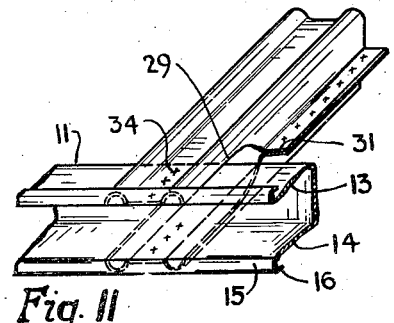
Figure 12:
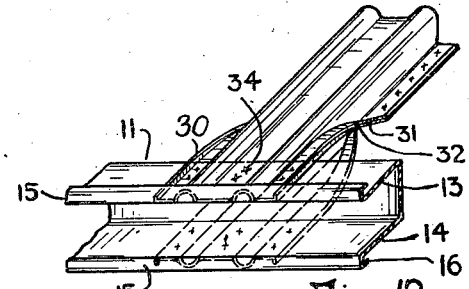
Figures 7, 8:
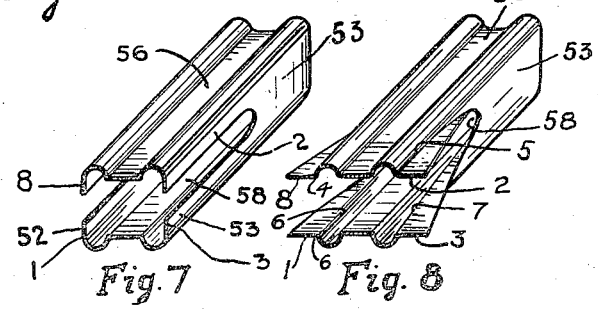
Figure 13:
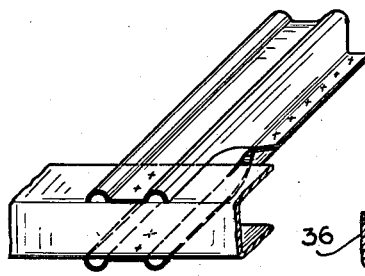
Figure 14:
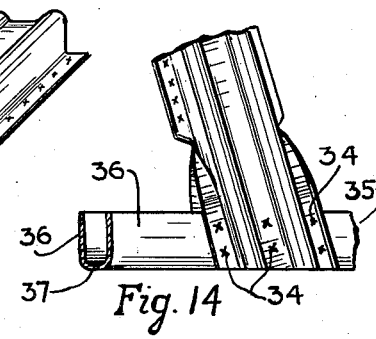
Figure 16:
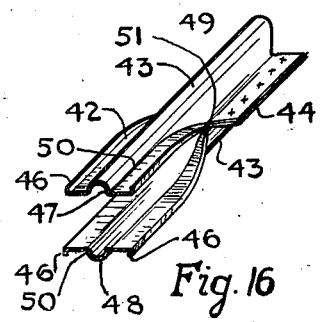
Figure 15:
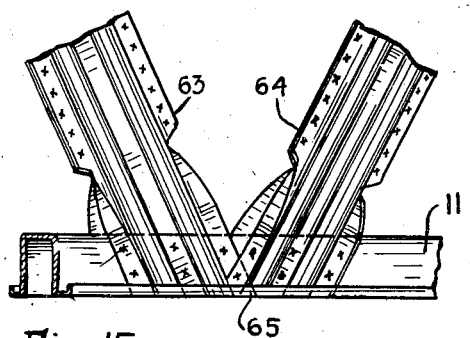
Figure 17:
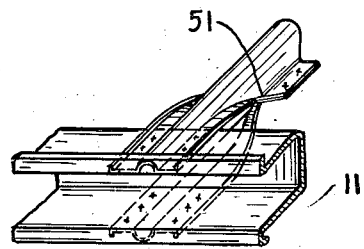
Figure 18:
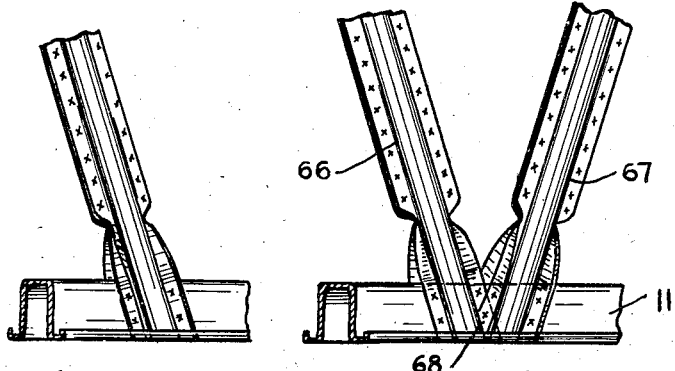
Figure 19:
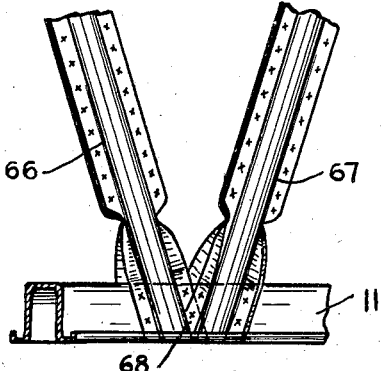
Figure 20:
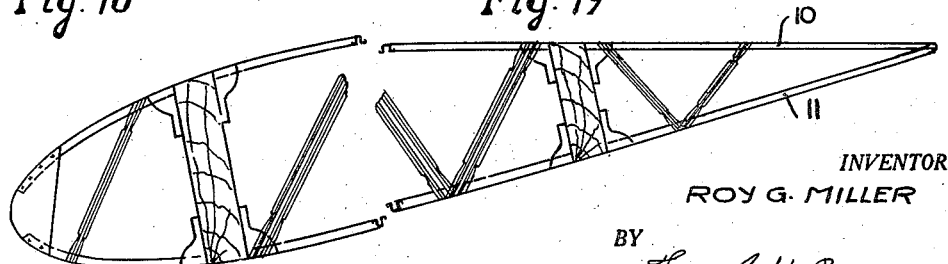

In the accompanying drawings:

Fig. 1 represents a perspective of a strut of closed section according to this invention comprising a seamless tube of relatively light gauge having each wall of one pair of parallel walls provided with two spaced longitudinal beads, Fig. 2 represents a perspective of a strut of a closed section according to another form of the invention utilizing a one-piece rolled or drawn welded tube formed of strips of sheet metal and providing a pair of beaded spaced walls similar to those of Fig. 1, Fig. 3 represents a perspective of a strut comprising a closed section according to a modified form of the invention utilizing two rolled or drawn strips of sheet metal joined with a lap seam and welded or riveted into a unit and providing a pair of beaded spaced walls similar to those of Fig. 1, Fig. 4 represents a perspective of a strut comprising a closed section according to a modified but preferred form of the invention in which two rolled or drawn strips of sheet metal are joined rigidly as by welding or the like through opposed flanges of the strips, and in which each strip provides a wall having a pair of spaced corner beads extending longitudinally of the strip, Fig. 5 represents a perspective of a strut comprising a closed section according to still a further modification formed of two rolled or drawn strips having flanges joined rigidly as by welding or the like and with each strip having a single bead extending longitudinally thereof, Fig. 6 represents a perspective of the strut of Fig. 4, cut away to receive a cap strip without interfering with carrying the longitudinal beads to the end of the strut, according to one illustrative form of the invention, in which perhaps 50% of the metal of the strut is available to form the joint with the cap strip, and illustrating the use of the corner beads as a means to insure the maintenance of a plane of the remaining walls to facilitate rigid anchoring to the cap strip, Fig. 7 represents a perspective of an end of an unflanged strut of a closed section according to Fig. 1, for example, showing one step in the method of flaring the end thereof to receive a cap strip, Fig. 8 represents a similar perspective of the strut shown in Fig. 7, after the final flaring step has been taken and the closed strut section has been opened to engage a cap strip by which perhaps 90% of the metal of the strut is available to form the joint of the strut and cap strip, Fig. 9 represents a perspective of an end of the flanged strut of Fig. 4 showing one step in the preferred method of flaring the end thereof to receive a cap strip, Fig. 10 represents a similar perspective of the struts of Figs. 4 and 7 after the final flaring step has been taken and the closed strut section has been opened to engage the cap strip with perhaps 90% or better, of the metal of the strut to form the joint with the cap strip, Fig. 11 represents a perspective of the strut of Fig. 6 in anchored engagement with one form of cap strip, Fig. 12 represents a perspective of the strut of Figs. 9 and 10 in anchored engagement with one form of cap strip, Fig. 13 represents a perspective of the strut of Fig. 6 in engagement with a modified form of cap strip, Fig. 14 represents a fragmentary elevation, partially in section, of an end of a flared strut according to this invention in oblique engagement with a modified form of cap strip, Fig. 15 represents a fragmentary elevation of two intersecting struts according to this invention in engagement with each other and with a cap strip, Fig. 16 represents a perspective of the strut of Fig. 5 showing the flared end in position to receive a cap strip, Fig. 17 represents a perspective of the strut of Fig. 16 with a cap strip engaged by and secured to the flared end of the strut, Fig. 18 represents a fragmentary elevation of the flared open end of the strut of Figs. 5 and 16 in oblique engagement with a cap strip, Fig. 19 represents a fragmentary elevation of two intersecting struts according to one form of the invention in engagement with each other and with a cap strip, and Fig. 20 represents a side elevation of a truss rib section utilizing the struts and cap strip of this invention.

The truss construction generally will be understood to comprise as in Fig. 20, upper or top cap strip 10, lower or bottom cap strip 11, and struts 12. Preferably each cap strip, another name for which is chord member or rib chord, comprises a squared substantially U-shaped channel having substantially parallel side web walls 13 and 14, the marginal edges of which are flanged for strength as at 15, and which flanges each have preferably an angular lip 16 extending with the flange longitudinally of each strip.

While the various sections will be found to be of various degrees of desirability, each having high utility according to the necessities and demands of the particular construction in view, it is preferred for general purposes that the section shown in Figs. 4, 9, 10, etc. be used, and the advantages of the invention will be described in connection with the strut of those figures.

Referring to Fig. 4, among others, it will be observed that the strut 12 comprises a pair of independently formed complemental portions 17 and 18, which preferably are identical but reversed and placed back to back to form a rigid closed hollow section. Front portion 17 comprises spaced oppositely extending side marginal flanges 20 and 21 lying in a common plane, spaced substantially parallel side web sections 22 and 23 substantially perpendicular to the plane of the flanges 20 and 21, and merging respectively into the curved beads or flutings 24 and 25 in the transverse front web surface 26. The transverse web or front wall 26 is substantially perpendicular to the side webs or sections 22 and 23 and usually and preferably substantially contains the axis of the respective longitudinal beads 24 and 25. The complemental rear portion 18 is the same as portion 17 except that the elements are reversed. Preferably long sections of the formed portions are rolled or drawn and are placed back to back with the respective juxtaposed flanges 20 and 21 in registering contact, then suitable means such as a series of rivets or welds 27 are applied substantially centrally of the engaged flanges 20 and 21 in longitudinal alignment in such spaced relation as may be desired. Long rigid closed tubular members are thus provided arranged to be subsequently severed into appropriate desired shorter lengths.

As rigidly formed according to the preferred practice each strut at one stage of its construction is closed throughout its length and both the beads or flutings and the flanges and associated surfaces all extend to the end of the strut.

The preferred step in the development of the strut end following the securing of the portions together and cutting them into suitable lengths is illustrated in Fig. 9. By reference to this figure it will be observed that the strut 12 has had the secured portions of its composite flanges removed for a short distance from an end as at 28, while leaving the short flange lips indicated at 30. This may be expeditiously accomplished by simply grinding off or otherwise removing the secured portions to form a flange shoulder 31, meeting lips 30 at an intersection such as 32.

It will be obvious that removal of the secured portions of the attached flanges 20 and 21 at 28, leaves the juxtaposed ends of strut portions 17 and 18 unsecured, even though the fragmentary lips 30 are still in contact. If flanges 20 and 21 are not too wide they may be left unsecured at the strut end in the fabrication of the strut, instead of removing the attached portions in a subsequent step as just described. By a suitable die (not shown), or any other desired means, the structure shown in Fig. 10 is formed.

Specifically, each side wall web 22 and 23, with its integral flange lip 30, at the strut end is forced out of its side wall alignment through 90° about a bend line 19 which is substantially diametrically opposite to the plane of front wall 26, with relation to the respective beads or flutes 24 and 25 so that the webs 22 and 23 become lateral extensions of the front wall and lie in a common plane with such wall. Longitudinally of the strut the flared extensions of the front wall are prolonged from the end for a distance at least as great as the width of a wall 13 or 14 of a cap strip 10 or 11, or to be described so as to afford a wide area of engagement with such strip. Beyond the line of the cap strip, the side webs 22 and 23 and bend line 19 curve inwardly away from the respective front and rear walls toward each other until they intersect substantially at point 32, at which point bend line 19 disappears.

It is a feature of the preferred form that bend line 19 occurs in virgin or previously unworked or unbent metal so that the frequently disastrous "reworking" of material is avoided. This is due to the fact that all previous bends between side and front walls have taken place in the beads themselves and such working in the bead has been in its crown and not as far down as the bend line 19.

It is a feature of the preferred form that the flange lips 30 are of such perpendicular extent relative to the side webs 22 and 23 as to permit flexing of such webs while substantially maintaining the perpendicular relation and thus to secure the desired strengthening action sought. If the flanges or lips 30 are too high, such flexing of the webs 22 or 23 might cause the lip to collapse out of its best reinforcing relation.

The action of the die as described has caused the closed strut to open at the ends to form a yoke, the legs of which are extensions of the strips 17 and 18 and which legs are in parallel spaced relation, and with their enlargements form, in effect integral attaching gusset like members, without the disadvantages of gussets as commonly provided. It is to be observed that the strut end shown in Fig. 10 utilizes at least 90% of the metal present in the closed section. It is to be observed in Fig. 12, that the strut end straddles the cap strut 11 without distortion and that the flat or plane portions 22, 23 and 26 of each leg is in contact with the respective juxtaposed walls 13 and 14 of the cap strut 11. The strut and cap strut are rigidly secured by suitable means such as by rivets or welds 34. The beads 25 and 26 extend the full length of the strut and across the cap strip, and, preferably, are stabilized by having the adjacent rigid extension surfaces, respectively 22, 26 and 23, rigidly engaged with the cap strip.

It will be evident that the strut of Fig. 10 may be associated with any sort of cap strip other than that disclosed in Fig. 10. For instance, an inverted cap strip 35, comprising the substantially U shaped member shown, may have the spaced substantially parallel side webs 36 and transverse connection 37 without longitudinal flanges, as shown in Fig. 14. The strut may have its end cut on the bias or at an oblique angle and be secured as shown by welds or rivets 34.

The principle of flaring the side web members of a strut for strengthening same, as a means of carrying the strength of the strut right into the basic section, finds satisfactory exemplification in the double beaded flanged strut of Fig. 4, but is equally available both by the flanged single rib section strut of Fig. 5, as well as by the straight sided closed sections of Figs. 1, 2 and 3, as will be explained.

Referring first to the disclosure of Fig. 5, the closed section is formed of upper and lower, or front and rear, identical portions 40 and 41. Each portion comprises a flange 42, an arcuate rib or bead 43 and a flange 44. The flanges of each portion lie in the same plane and are placed with the flanges of the complemental portion in registry, and the latter are then rigidly secured by the connecting rivets or welds 34, preferably disposed substantially centrally of the flanges. It is preferable to form long struts and subsequently cut to the size desired as in the preferred form.

By reference to Figs. 16 and 17, it will be observed that after the attached flanges 42 and 44 and their anchors 34, the strut may be subjected to a similar grinding off process or step by which the secured portions are removed at an end to form flange lips 46. Then by suitable means (not shown), the flanges 42 and 44, with their respective integral flange lips 46, are forced apart and bent up into front and rear walls 47 and 48, having each flattened panels 42 and 44 in a common plane substantially diametrical (preferably) of the bead 43 by bending along bend lines 50, and curve inwardly to engagement at 51. It will be understood that the strut of Figs. 5, 16 and 17 may engage a cap strip 11 or 36, as desired and as shown in Fig. 1.

Referring to Fig. 1 as illustrative of a closed unflanged section, of which Figs. 2 and 3 are other examples, the closed sections disclosed is subject to the same flaring operation as has already been described in connection with the other figures. This strut comprises plane side walls 52 and 53 merging into the respective longitudinal beads 54 and 55, which latter merge into the front and rear panels or walls 56 and 57.

Referring to Figs. 7 and 8 each side wall is cut, slit or slotted longitudinally for a short distance as at 58. The cutting separates side wall 52 into webs 8 and 1, and side wall 53 into webs 2 and 3. Subjecting the slotted strut end to the action of the die or other spreading means, results in webs 8 and 2 being bent up out of the side wall planes on bend lines respectively 4 and 5, to lie in a plane common to front panel 56, while webs 1 and 3 are bent on bend lines 6 and 7 to lie in a plane common to rear wall or panel 57. Bend lines 4 and 5, and 6 and 7, disappear toward the inner ends of slots 58.

The attachment of the open end of the strut of Figs. 1, 7 and 8 to a cap strip is so similar to that already described that a disclosure of the specific connection is deemed superfluous.

Another manner of opening the closed strut section, applicable to all of the forms shown in Figs. 1 to 5 inclusive, and illustrated with the flanged double beaded form of Fig. 4, is shown in Fig. 6. It furnishes an illustration of another advantage of the beads of this invention in that if the closed section were merely square, of such dimensions that one pair of spaced walls would slidably engage a given cap strip, it would be impossible to cut away the side walls and leave the front and rear ones, for instance, without forming such a bead or rim on the radius of the corner as would prevent either rear or front wall from lying flat against the adjacent cap strip. Cutting away the entire side wall therefor would involve such added cost of filing or trimming away the burred edge as to render it undesirable. In the forms of invention shown in Figs. 6 and 11 the flanged strip has the side walls and flanges cut away on lines 29, to form front and rear cap engaging surfaces comprised respectively of the median front panels 26 and rear panel 27 and the cut edges 29 of beads 24 and 25. The provision of the beads affords clearance by which a punching cutter can cut the side walls exactly in the desired plane. This opening of the strut removes perhaps 50% of the material of the closed section and is not as desirable as some other forms shown, but it is effective for many purposes, and is an economical procedure. Obviously the punched or cut out open end engages the cap strip by welding or uniting through the plane portion of the front and rear walls as shown at 34 in Fig. 11.

It will frequently happen that two struts will be arranged to engage a single cap strip as close to a given point as possible. The line of each strut being preferably intersecting that of the adjacent strut as close to the cap strip as possible. Referring to Fig. 15, a strut 63 of the double beaded wall type is disposed with its open end oblique to a cap strip 11. An intersecting strut 64 has a corner of each flared leg cut away as at 65, so as to bring the struts closer together on the strip. In Fig. 19 the single bead struts 66 and 67 have one corner 68 removed so as to facilitate their close engagement with the cap strip 11.

I claim:

1. A strut of a structural section comprising a closed non-cylindrical tubular element having a substantially semi-cylindrical reinforcing bead extending the full length of the strut, the end of the strut comprising two spaced walls having flat areas arranged to receive a cap strip between them said flat areas extending substantially diametrically of said bead, one of said walls having the bead extending to its end adjacent a flat area.

2. A strut of a structural section comprising a closed non-cylindrical tubular element having a substantially semi-cylindrical reinforcing bead extending the full length of the strut, the end of the strut comprising two spaced substantially parallel walls arranged to engage spaced surfaces of a cap strip, one of said walls containing the bead and having surfaces on each side of the bead in a single common plane to engage such cap strip, the plane surfaces merging into said bead substantially diametrically of said bead.

3. A strut of a structural section comprising a closed non-cylindrical tubular element comprising side walls and front and rear walls, the front and rear walls each having at both intersections with the side walls a bead running longitudinally the entire length of the strut, said bead in transverse section being arcuate with a diameter appreciably less than the width of the element, the end of the strut being open to receive a cap strip and comprising spaced front and rear walls, with the side walls removed from a line intersecting the respective beads in substantial alignment with the respective front and rear walls so as to provide clearance to receive a cap strip of substantial width in engagement with the spaced front and rear walls and with cut edge surfaces of said beads.

4. A strut of a structural section comprising a closed non-cylindrical tubular element of side walls and front and rear walls, the front and rear walls having each a bead running longitudinally the entire length of the strut, said bead in transverse section being arcuate with a diameter appreciably less than the width of the element, the end of the strut being open to receive a cap strip and comprising spaced front and rear walls, with the side walls so treated as to provide clearance so as to receive a cap strip of substantial width in engagement with the spaced front and rear walls, the treatment including disposition of portions of the side walls in the substantial plane of the front and rear walls to form lateral extensions thereof substantially diametrical of the respective beads to stabilize the beads.

5. A strut of a structural section comprising a closed tubular element of front and rear non-cylindrical strips secured rigidly together and each having a reinforcing bead extending the full length of the strip and in section being substantially arcuate with a diameter appreciably less than the width of the respective strip, the end of the strut comprising substantially parallel spaced walls containing bead terminals and each comprising portions of the side walls bent into the plane of the respective front and rear walls and intersecting each bead substantially radially thereof.

6. A strut of a structural section comprising a closed tubular walled element having a median longitudinal plane, flanges disposed substantially in the plane, a reinforcing bead formed in the element on each side of said plane, an open end of the strut being formed by bent wall portions having angularly divergent flange lips merging into the flanges of the strut.

7. A structural section joint comprising a cap strip having spaced substantially parallel walls, a strut comprising a closed section having an end formed of spaced laterally enlarged substantially parallel walls arranged to slidably engage the respective parallel walls of the cap strip, a substantially semi-cylindrical bead formed in and common to the closed section and one of the parallel walls extending to the end of said wall and of a diameter appreciably less than the width of the closed section, the lateral enlargements of said walls being bent beyond the cap strip into mergence with the side walls of the strut.

8. A strut comprising an open end formed of spaced substantially parallel front and rear strut walls having clearance to admit a cap strip between them, the strut having portions of the front and rear walls bent to integral mergence in side walls of a closed tubular section, and a plurality of beads in both the front and rear walls extending longitudinally the full length of the strut, and each comprising a substantially semi-cylindrical rib of a diameter appreciably less than the width of the closed section.

9. A method of forming a cap engaging strut which consists in forming a closed tubular section having front, rear and side walls and flanges extending from the side walls with the flanges secured together, in removing a portion of the secured flanges to form unsecured flange lips, then bending portions of the side walls carrying the lips into lateral alignment at their ends with the respective front and rear walls.

10. A method of forming cap strip engaging struts which comprises forming a closed tubular section having longitudinal flanges, of removing part of the flanges to form a line of division between front and rear portions of the strut for a short distance from the end, and then of bending portions of the side walls adjacent to the line of division into alignment with the respective front and rear walls to form spaced cap strip engaging surfaces which externally are aligned continuations of the closed section external surfaces.

11. A strut comprising a closed tubular section comprising front, rear and side walls, each side wall merging into the respective front and rear walls by means of a reinforcing bead extending the full length of the strut, respective portions of the side walls at the end of the strut being bent into alignment with the respective front and rear walls diametrically of said beads, the whole so arranged that the fabrication of the strut and of the cap strip receiving end involves a minimum of bending and reworking of the metal.

12. A strut comprised of front, rear and side walls, the side walls merging into the respective front and rear walls by substantially semi-cylindrical reinforcing beads extending the full length of the strut, said front and rear wall surfaces each comprising a plane surface extending substantially diametrically of the beads and longitudinally of the strut, said side walls being removed for a short distance from the end by a longitudinally extending transverse cut into said beads in alignment with the respective front and rear surfaces to insure that the ends of the front and rear walls lie in longitudinally extending substantial planes containing the edges of the respective side walls.

13. A strut comprising a substantially rectangular closed section having spaced substantially planar side walls each merging tangentially into longitudinal beads of relatively short radius, each bead respectively merging into longitudinally extending planar portions of appreciable width to facilitate spot welding between beads, the planar portions each being recessed below the peak of the beads and disposed substantially radially thereof.

14. A strut comprising a substantially rectangular closed section having spaced substantially planar side walls each merging tangentially into longitudinal beads of relatively short radius, each bead respectively merging into longitudinally extending planar portions of appreciable width to facilitate spot welding between beads, the planar portions each being recessed below the peak of the beads and disposed substantially radially thereof, and the end of the strut comprising portions of the side walls bent to intersect the adjacent bead in alignment with said planar portions to form additional spot welding area in a common plane with the planar portions.

15. A strut comprising a substantially rectangular closed section having spaced substantially planar side walls each merging tangentially into longitudinal beads of relatively short radius, each bead respectively merging into longitudinally extending planar portions of appreciable width to facilitate spot welding between beads, the planar portions each being recessed below the peak of the beads and disposed substantially radially thereof, and the end of the strut comprising portions of the side walls bent to intersect the adjacent bead in alignment with said planar portions to form additional spot welding area in a common plane with the planar portions, said bent side wall portions merging into the side walls spaced from the end.

16. A strut comprising a substantially rectangular closed section having spaced substantially planar side walls each merging tangentially into longitudinal beads, the pair of beads on each respective side of the section merging integrally into a recessed planar portion substantially perpendicular to each bead, each side wall having a perpendicular flange and the end of the strut including a portion of the side wall and flange bent out of the side wall disposition and with the side wall portion bent into a plane common to the respective recessed planar portion with the flange angularly disposed thereon.

17. In combination a cap strip including a pair of spaced substantially parallel longitudinally extending walls, a longitudinally flanged closed strut connected to the strip and comprising at an end a pair of substantially parallel spaced legs having each at least two flattened longitudinally extending areas, those of each leg lying in a substantially common plane and juxtaposed upon the respective substantially parallel walls, a flat area on each leg merging into the walls of the closed strut, the strut comprising on each side of the flange a bead extending the full length of the strut and separating the said flattened areas, and means connecting the said flattened areas to the said spaced walls.

18. A strut comprised of two substantially identical portions, each portion comprising a pair of spaced flanges and a beaded portion connecting the flanges, and the portions disposed in confronting relation with the respective flanges in juxtaposition, means rigidly connecting the flanges together to form a closed tubular strut having flanges extending in a common plane from each side of the strut, an end of the strut comprised of the beaded portion with the flanges substantially removed, and with the side walls of the strut adjacent to the bead bent out of strut alignment and into common planes substantially parallel to but spaced from the flanges.

19. In combination a closed non-cylindrical tubular strut section comprised of a beaded portion and flanges extending laterally of the beaded portion in a common median longitudinal plane, the beaded portion including wall portions and a bead of relatively small arc compared to the strut width, a cap strip to which the strut is attached comprised of two substantially planar spaced walls, the spacing of which is less than the width of the strut through the bead by approximately the radius of the bead, at the strut end the wall portions being bent to lie in a plane substantially diametrical of said bead, which diametrical plane is spaced from but is substantially parallel to the said plane of the flanges, said wall portions engaging and being secured to the spaced cap strip walls.

20. A strut comprised of a pair of elements each of which has spaced flanges lying in a common plane with the elements disposed in confronting relation to form a closed section with juxtaposed flanges secured together, portions of said secured flanges being removed adjacent to the strut end so as to establish a plane of separation between the elements adjacent said end, the portions of each element adjacent to such plane of separation being bent to lie substantially in a common plane spaced from but substantially parallel to such plane of separation, so as to secure an end capable of straddling a transverse member.

21. In combination a strut comprised of identical portions each including a central part merging into two spaced longitudinally extending flanges lying in common planes, the portions disposed in confronting relation with flanges in juxtaposition, means securing adjacent flanges together to form a closed section having laterally projecting longitudinally extending composite flanges, the composite flanges being cut away adjacent a strut end to establish a line of separation on each side of the section in a plane longitudinal of the section, the material of each portion adjacent the strut end being bent laterally away from each line to provide two surfaces lying substantially in respective common planes parallel to but spaced from the plane of said flanges and of such longitudinal and lateral extent as to form spaced bearing surfaces.

22. In combination a strut comprised of identical portions each including a central part merging into two spaced longitudinally extending flanges lying in a common plane, the portions disposed in confronting relation with flanges in juxtaposition, means securing adjacent flanges together to form a closed section having laterally projecting longitudinally extending composite flanges, the composite flanges being cut away adjacent a strut end to establish a line of separation on each side of the section in a plane longitudinal of the section, the material of each portion adjacent the strut end being bent laterally away from each line to provide two surfaces lying substantially in a common plane parallel to but spaced from the plane of said flanges and of such longitudinal and lateral extent as to form spaced bearing surfaces, and a transverse member having substantially parallel spaced walls disposed between the said bearing surfaces, and means securing the strut and transverse member together.

23. The method of forming struts which comprises forming a closed section of two confronting flanged members, securing adjacent flanges together substantially in a common plane, then substantially removing the secured flanges adjacent an end of the section, thus forming a plane of separation between the members, then bending material of each member adjacent to the plane of separation into a substantial plane parallel substantially to but spaced perpendicularly from the plane of said flanges to form an open end to engage a transverse member.

ROY G. MILLER.